(12) United States Patent
Heck et al.

(10) Patent No.: US 6,506,842 B1
(45) Date of Patent: *Jan. 14, 2003

(54) RHEOLOGY-MODIFIED THERMOPLASTIC ELASTOMER COMPOSITIONS AND ARTICLES FABRICATED THEREFROM

(75) Inventors: Henry George Heck, Lake Jackson, TX (US); Deepak Rasiklal Parikh, Lake Jackson, TX (US); Laura Bauerle Weaver, Lake Jackson, TX (US); James Robert Bethea, Baton Rouge, LA (US); Larry Alan Meiske, Baton Rouge, LA (US); Michael Francis Martin, Lake Jackson, TX (US)

(73) Assignee: DuPont Dow Elastomers L.L.C., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,870

(22) Filed: Nov. 14, 1997

Related U.S. Application Data

(60) Provisional application No. 60/036,980, filed on Jan. 29, 1997.

(51) Int. Cl.$^7$ .......................... C08L 23/16; C08L 23/10; C08G 81/02
(52) U.S. Cl. ................. 525/194; 525/192; 525/211; 525/232; 525/240; 524/423; 524/424; 524/425; 524/426; 524/427; 524/445; 524/451; 524/518; 524/525; 524/528
(58) Field of Search ................. 525/194, 192, 525/211, 232, 240; 524/424, 425, 426, 427, 451, 445, 423, 518, 525, 528

(56) References Cited

U.S. PATENT DOCUMENTS

| | | | |
|---|---|---|---|
| 3,758,643 A | 9/1973 | Fischer | 260/45.7 |
| 3,806,558 A * | 4/1974 | Fischer | 525/211 |
| 3,862,106 A | 1/1975 | Fischer | 260/80.78 |
| 3,957,919 A | 5/1976 | Von Bodungen et al. | 260/33.6 |
| 4,130,535 A | 12/1978 | Coran et al. | 260/33.6 |
| 4,177,160 A | 12/1979 | Cecchin et al. | 251/429 |
| 4,379,888 A * | 4/1983 | Yoshimura et al. | 525/211 |
| 4,861,834 A | 8/1989 | Audureau et al. | |
| 5,218,046 A | 6/1993 | Audureau et al. | |
| 5,272,236 A | 12/1993 | Lai et al. | 526/348 |
| 5,278,272 A | 1/1994 | Lai et al. | 526/348.5 |
| 5,308,699 A | 5/1994 | Hikasa et al. | |
| 5,308,700 A | 5/1994 | Hikasa et al. | |
| 5,334,663 A | 8/1994 | Audureau et al. | |
| 5,384,366 A | 1/1995 | Paganelli | |
| 5,639,818 A | 6/1997 | Lee et al. | |
| 5,656,691 A | 8/1997 | Niki et al. | |
| 5,728,744 A | 3/1998 | Okada et al. | |
| 5,763,532 A * | 6/1998 | Harrington et al. | 525/194 |
| 5,786,403 A | 7/1998 | Okada et al. | |
| 5,837,787 A * | 11/1998 | Harrington | 526/281 |
| 5,847,052 A | 12/1998 | Hamanaka et al. | |
| 5,852,100 A | 12/1998 | Sadatoshi et al. | |
| 6,207,746 B1 | 3/2001 | Uchida et al. | |
| 6,359,073 B1 * | 3/2002 | Babb et al. | 525/194 |

FOREIGN PATENT DOCUMENTS

| | | | |
|---|---|---|---|
| EP | 0 587 453 A2 | 3/1994 | H01B/3/44 |
| EP | 0 837 098 A1 | 5/1996 | C08L/23/02 |
| EP | 0 842 979 A1 | 11/1997 | C08L/23/16 |
| WO | WO 84/06859 | 3/1994 | C08L/23/04 |
| WO | WO 97/32922 | 9/1997 | C08J/3/24 |
| WO | WO 97/39059 | 10/1997 | C08L/23/16 |

* cited by examiner

Primary Examiner—D. R. Wilson

(57) ABSTRACT

Rheology-modified thermoplastic elastomer compositions are prepared by peroxide modification of a melt blend of an ethylene/α-olefin polymer or a diene-modified ethylene/α-olefin polymer and a high melting polymer such as polypropylene or a propylene/α-olefin copolymer. The resulting compositions have an elastomeric phase, a non-elastomeric phase and certain physical properties that exceed those of a like composition that is not rheology-modified. The compositions can be used to make a variety of articles of manufacture via conventional procedures.

13 Claims, No Drawings

US 6,506,842 B1

RHEOLOGY-MODIFIED THERMOPLASTIC ELASTOMER COMPOSITIONS AND ARTICLES FABRICATED THEREFROM

This application claims the benefit of U.S. Provisional Application No. 60/036,980 filed Jan. 29, 1997.

FIELD OF THE INVENTION

This invention relates generally to rheology-modified thermoplastic elastomer (TPE) compositions that comprise an elastomeric ethylene/alpha ($\alpha$)-olefin (EAO) polymer or EAO polymer blend and a high melting propylene polymer, preparation of the compositions, use of such compositions in processes such as profile extrusion and injection molding to make articles of manufacture and the resulting articles of manufacture. This invention particularly relates to such compositions wherein both components are peroxide-modified, methods for preparing the compositions, such as by peroxide modifying a physical blend of the components, and use of such compositions to produce fabricated articles, some of which are thin-walled parts such as work boot shafts via injection molding, refrigerator gaskets via profile extrusion and automotive skins via sheet extrusion and or calendering and then thermoforming.

BACKGROUND OF THE INVENTION

Manufacturers of elastomeric parts engage in an ongoing search for elastomers with processing characteristics that allow them to attain any or all of higher rates of productivity, improved quality and broader markets. Conventional processes used to make such parts include, without limitation, injection molding, profile extrusion, film extrusion, calendering, thermoforming, blown film, sheet extrusion processes. Four useful measures of how a formulation or composition will process are: shear thinning index (STI), melt strength: (MS), solidification temperature (ST) and upper service temperature (UST). Improvements in these properties have, a direct affect upon productivity, quality and market breadth relative to such elastomeric parts.

STI, as used herein, is a ratio of polymer viscosity at a specified low shear rate divided by polymer viscosity at a specified high shear rate. For ethylene/alpha-olefin (EAO) polymers, a conventional STI test temperature is 190° centigrade (° C). Polymer viscosity is conveniently measured in poise (dyne-second/square centimeter ($cm^2$)) at shear rates within a range of from 0.1 radian per second (rad/sec) to 100 rad/sec and at 190° C. under a nitrogen atmosphere using a dynamic mechanical spectrometer such as an RMS-800 or ARES from Rheometrics.

MS, as used herein, is a maximum tensile force, in centiNewtons (cN), measured on a molten filament of a polymer melt extruded from a capillary rheometer die at a constant shear rate of 33 reciprocal seconds ($sec^{-1}$) while the filament is being stretched by a pair of nip rollers that are accelerating the filament at a rate of 0.24 centimeters per second per second ($cm/sec^2$) from an initial speed of 1 cm/sec. The molten filament is preferably generated by heating 10 grams (g) of a polymer that is packed into a barrel of an Instron capillary rheometer, equilibrating the polymer at 190° C. for five minutes (min) and then extruding the polymer at a piston speed of 2.54 cm/min through a capillary die with a diameter of 0.21 cm and a length of 4.19 cm. The tensile force is preferably measured with a Goettfert Rheotens that is located so that the nip rollers are 10 cm directly below a point at which the filament exits the capillary die.

ST, as used herein, is the temperature of the highest temperature peak endotherm measured during cooling (in ° C) with a differential scanning calorimeter (DSC), such as that sold by TA Instruments, Inc., as the polymer is first heated at a rate of 10° C./minute (min) from ambient temperature to a temperature of 200° C., then cooled at a rate of 10° C./min to a temperature of −30° C. and then typically reheated at a rate of 10° C./min to a temperature of 200° C.

UST, as used herein, is that temperature (° C) at which a thermomechanical analyzer (TMA) penetration probe penetrates a specimen having a thickness of two to three millimeters (mm) to a depth of 900 micrometers ($\mu$m). A suitable TMA is produced by TA Instruments, Inc. A one Newton (N) force is applied to the penetration probe as it rests on a surface of the specimen that is in a chamber where temperature is ramped at a rate of 5° C./min.

When using a profile extrusion process, a manufacturer usually desires an elastomer that "shear thins" or decreases in viscosity with applied shear forces. Because pressure drop across an extruder die and amperage required to turn an extruder screw are directly related to elastomer viscosity, a reduction in elastomer viscosity due to shear thinning necessarily leads to a lower pressure drop and a lower amperage requirement. The manufacturer can then increase extruder screw speed until reaching a limit imposed by amperage or pressure drop. The increased screw speed translates to an increase in extruder output. An increase in shear thinning also delays onset of surface melt fracture (OSMF), a phenomenon that otherwise limits extruder output. Surface melt fracture is usually considered a quality defect and manufacturers typically limit extruder output and suffer a productivity loss to reach a rate of production that substantially eliminates surface melt fracture.

When producing profile extrusions with thin walls and a complex geometry, a manufacturer looks for an elastomer with high MS and rapid solidification upon cooling in addition to good shear thinning behavior. A combination of a high MS and rapid solidification upon cooling (high ST) allows a part to be extruded hot and cooled below the elastomer's solidification temperature before gravity and extrusion forces lead to shape distortion. Ultimately, for broad market acceptance, a finished part should also retain its shape despite short term exposure to an elevated temperature during processing, shipping or eventual use.

The characteristics of high STI, high MS, rapid solidification (high ST) and increased UST are also important to manufacturers who produce elastomeric parts via injection molding. Resin pressure during injection is directly related to viscosity of the resin under specific shear conditions. A viscosity reduction due to shear thinning lowers resin pressure and reduces clamp tonnage requirements. A high MS helps eliminate part distortion during removal of a non-molten, freshly molded part from a mold. In addition, rapid solidification and increased UST allow a second polymer to be injection molded over the part without that part being deformed or melted during the second injection. Rapid solidification leads to shorter cycle times. Finally, a part must retain its strength at service temperatures and an increase in UST opens up additional markets for elastomeric parts.

Elastomeric part manufacturers who fabricate thin-walled (e.g. 2.5 mm thick), injection molded parts such as shafts (with a height of, for example, 18 inches: (45.7 cm) for industrial work boots have additional requirements beyond those specified for injection molding. They require a Shore A hardness of 30–60, preferably 35–50, for comfort around a wearer's calf. For articles of manufacture like work boots, they also seek a lower density material to make the resulting article lighter, good low temperature flexibility and improved resistance to chemicals, solvents or both. As an illustration, flexible polyvinylchloride (PVC) has a density of about 1.33 g per cubic centimeter (g/cc) and less than desirable cold temperature flexibility. Oil extended styrene block polymers such as styrene/butadiene/styrene (SBS) polymers have a density of about 1.05 g/cc and undesirable chemical resistance, solvent resistance or both.

Manufacturers who prepare elastomeric extruded and blown films and calendered sheets seek the same characteristics as those who use injection molding. An improved or increased shear thinning rheology leads to higher production rates before OSMF with its attendant variability in film or sheet thickness. A high MS promotes bubble stability in a blown film operation and provides a wide window of operations for further processing of such films via thermoforming. A high MS also promotes roll release during calendering. Rapid solidification or solidification at a higher temperature keeps an embossed calendering profile from collapsing or being wiped out. As with injection molding, an increase in UST leads to an expansion of potential markets for resulting film and sheets.

Linear EAO polymers produced via metallocene catalysis and substantially linear ethylene and EAO polymers (SLEPs) produced via constrained geometry catalysis have densities of 0.91 g/cc or less. These polymers provide additional options for fabricators of elastomeric parts. At least some of these polymers process like traditional thermoplastic polymers but have a degree of pliancy and flexibility typically associated with softer, rubberlike materials. With technology advances, certain of these polymers now have densities as low as about 0.86 g/cc and a Shore A hardness, measured in accordance with American Society of Testing and Materials (ASTM) test D-2240, of about 64. The latter polymers have excellent light and oxidation resistance, but their melting points may be as low as about 43° C. due to their low levels of crystallinity.

The use of linear EAOs and SLEPs, particularly those with the lowest densities, has led to a desire for improvements in an overall balance of processing characteristics. The desire includes simultaneous advances in STI, MS, ST and UST. These advances are constrained by a requirement to substantially avoid generation of gel particles. Gel particles, when present, adversely affect the appearance of thin-walled extrusions, films and sheets.

U. S. patent application Ser. No. 60/012873, filed Mar. 5, 1996, teaches rheological modification of EAO copolymers via use of a peroxide. One benefit resulting from such use is an ability to increase the STI from 7.6 for an unmodified resin up to 158.5 for a modified resin. Use of a peroxide also yields an increase in melt strength at 150° C. from 0.81 cN for unmodified resin to 66.75 cN for a modified resin. These benefits are achieved without a measurable gel content. Peroxide modification does not, however, result in any improvement in either UST or ST of an EAO copolymer.

W. K Fischer provides a variety of teachings regarding blends of an EAO polymer with a polyolefin. For example, U.S. Pat. No. 3,758,643 and U.S. Pat. No. 3,806,558 contain teachings about partially cured blends of an EAO copolymer with a polyolefin. U.S. Pat. No. 3,862,106 relates to thermoplastic dynamically cured blend of EAO copolymers with a polyolefin. Both partial curing and dynamic curing lead to an increase in insoluble gel content. Testing for insoluble gel content (or gel value) uses cyclohexane at 23° C. An acceptable substitute is boiling xylene, a common solvent that yields a gel value 30–50% lower than that found using cyclohexane. Fischer provides several examples in which gel particles are present at a high enough level to cause unacceptable roughness when partially cured or dynamically cured compositions are extruded as a one eighth inch rod.

G. Von Bodungen et al. teach, in U.S. Pat. No. 3,957,919, incorporation of polyethylene (PE) into the thermodynamically cured EAO/polyolefin blend compositions of U.S. Pat. No. 3,862,106. The PE helps protect polyolefins such as polypropylene (PP) from chain scission. This leads, in turn, to an increased gel content as measured with cyclohexane.

A. Y. Coran et al. teach, in U.S. Pat. No. 4,130,535, thermoplastic vulcanizates (TPVs) comprising blends of a crystalline thermoplastic polyolefin and a vulcanized EAO copolymer rubber. These compositions have a high gel content as no more than about 3% of the rubber is extractable in cyclohexane at 23 C.

SUMMARY OF THE INVENTION

It has now surprisingly been found that even though rheology modification, such as by addition of a peroxide, has no effect on the ST or UST limit of an EAO polymer, it has a dramatic effect on the ST and UST limits of blends of at least one elastomeric EAO polymer or EAO polymer blend and a high melting polyolefin such as PP. In addition, rheology modification of such blends yields a STI that exceeds the STI of (a) a rheology modified EAO polymer or EAO polymer blend or (b) a blend, without rheology modification, of the same high melting polyolefin and an EAO polymer or EAO polymer blend. As such, one aspect of this invention is a rheology-modified, substantially gel-free thermoplastic elastomer (TPE) composition comprising an EAO polymer or EAO polymer blend and at least one high melting polymer selected from the group consisting of polypropylene homopolymers and propylene/ethylene copolymers, the composition having a combination of at least three of four characteristics, the characteristics being a shear thinning index of at least 20, a melt strength that is at least ($\geq$) 1.5 times that of the composition without rheology modification, a solidification temperature that is at least 10° C. greater than that of the composition without rheology modification, and an upper service temperature limit that is at least 10° C. greater than that of the composition without rheology modification.

The rheology-modified ITE compositions may be compounded with conventional additives or process aids including, for example, fillers, stabilizers, dispersants, pigments and process oils. Compounds prepared from the rheology modified polymers of this invention retain their processing advantages over compounds prepared from the same polymers, but without rheology modification. The rheology modification is preferably induced via a peroxide, but may be accomplished thermally or by irradiation, including e-beam.

In a first related aspect, the TPE compositions of the first aspect may further comprise at least one additive selected from the group consisting of process oils, fillers and blowing agents.

In a second related aspect, the TPE compositions of the first aspect may be blended with another polymer, preferably one of the polymers used to make the TPE composition, prior to fabrication of an article of manufacture. Such blending may occur by any of a variety of conventional techniques, one of which is dry blending of pellets of the TPE composition with pellets of another polymer.

A second aspect of this invention is a process for preparing a rheology-modified, substantially gel-free TPE composition, the process comprising: a) providing a combination of an organic peroxide and a molten polymer composition that comprises at least one of (1) an elastomeric ethylene/alpha-olefin polymer or ethylene/alpha-olefin polymer blend and (2) a high melting polymer selected from the group consisting of polypropylene homopolymers and propylene/ethylene copolymers; and b) maintaining the combination in a melt state while subjecting it to conditions of shear sufficient to disperse the peroxide throughout the molten polymer composition, effect sufficient rheology modification of the molten polymer composition and substantially preclude formation of insoluble polymer gels, sufficient rheology modification being measured by a combination of at least three of four characteristics, the characteristics being a shear thinning index of at least 20, a melt strength that is at least about 1.5 times that of the polymer blend without rheology modification, a solidification temperature that is at least 10° C. greater than that of the polymer blend without rheology modification, and an upper service temperature limit that is at least 10° C. greater than that of the polymer blend without rheology modification. The process optionally includes a step c) wherein the rheology modified polymer blend is converted to an article of manufacture that has the combination of at least three of four characteristics. If the process includes step c), it may be further modified to comprise sequential intermediate steps b1) and b2) that precede step c), step b1) comprising recovery of the rheology modified polymer blend as a solid and step b2) comprising conversion of the solid to a melt state sufficient for fabricating the article of manufacture.

One variation of the second aspect involves adding the high melting polymer to the molten polymer composition while the composition is in a melt state, but subsequent to rheology modification of the elastomeric ethylene/alpha-olefin polymer or elastomeric ethylene/alpha-olefin polymer blend.

A second variation of the second aspect involves adding, either before or after step b), at least one additive selected from the group consisting of process oils, fillers and blowing agents, the process oil being present in an amount within a range of from 0 to about 50 weight percent, the filler being present in an amount within a range of from 0 to about 70 weight percent, and the blowing agent being present in an amount within a range of from 0 to about 10 weight percent, all amounts being based on total composition weight, the filler, when present, being selected from the group consisting of glass, silica, carbon black, metal carbonates, metal sulfates, talc, clay and graphite fibers.

A third aspect of this invention is an article of manufacture having at least one component thereof fabricated from the TPE composition of the first aspect of the invention or prepared by the process of the second aspect of the invention. The compositions readily allow formation of articles of manufacture using apparatus with suitable upper pressure limitations combined with relatively long flow paths and narrow flow channels. The following paragraph contains a partial listing of suitable articles of manufacture.

DESCRIPTION OF PREFERRED EMBODIMENTS

The compositions of this invention can be formed into a variety of shaped articles using conventional polymer fabrication processes such as those identified above. A partial, far from exhaustive, listing of suitable shaped articles includes automobile body parts such as bumper fascia, body side moldings, exterior trim, interior trim, air dams, air ducts, wheel covers and instrument and door panel skins, and non-automotive applications such as polymer films, polymer sheets, trash cans, storage containers, swim fins, lawn furniture strips or webbing, lawn mower and other garden appliance parts, recreational vehicle parts, golf cart parts, utility cart parts and water craft parts. The compositions can also be used in roofing applications such as roofing membranes. The compositions can further be used in fabricating components of footwear such as a shaft for a boot, particularly an industrial work boot. A skilled artisan can readily augment this list without undue experimentation.

The rheology-modified compositions of this invention comprise an elastomeric EAO polymer or EAO polymer blend and a high melting polymer. The compositions desirably contain the EAO polymer or EAO polymer blend in an amount of from about 50 to about 90 wt % and the high melting polymer(s) in an amount of from about 50 to about 10 wt %, both percentages being based on composition weight. The amounts are preferably from about 65 to about 85 wt % EAO and from about 35 to about 15 wt % high melting polymer. The amounts are chosen to total 100 wt %.

EAO polymers (also referred to as "ethylene polymers") that are suitable for this invention include interpolymers and diene modified interpolymers. Illustrative polymers include ethylene/propylene (EP) copolymers, ethylene/butylene (EB) copolymers, ethylene/octene (EO) copolymers, ethylene/alpha-olefin/diene modified (EAODM) interpolymers and ethylene/propylene/diene modified (EPDM) interpolymers. More specific examples include ultra low linear density polyethylene (ULDPE) (e.g., Attane™ made by The Dow Chemical Company), homogeneously branched, linear EAO copolymers (e.g. Tafmer™ by Mitsui PetroChemicals Company Limited and Exact™ by Exxon Chemical Company), and homogeneously branched, substantially linear EAO polymers (e.g. the Affinity™ polymers available from The Dow Chemical Company and Engage® polymers available from DuPont Dow Elastomers L.L.C. The more preferred EAO polymers are the homogeneously branched linear and substantially linear ethylene copolymers with a density (measured in accordance with ASTM D-792) of from about 0.85 to about 0.92 g/cc, especially from about 0.85 to about 0.90 g/cc and a melt index or I2 (measured in accordance with ASTM D-1238 (190° C./2.16 kg weight) of from about 0.01 to about 30, preferably 0.05 to 10 g/10 min.

The substantially linear ethylene copolymers or interpolymers (also known as "SLEPs") are especially preferred. In addition, the various functionalized ethylene copolymers such as EVA (containing from about 0.5 to about 50 wt % units derived from vinyl acetate) are also suitable. When using an EVA polymer, those that have an I2 of from about 0.01 to about 500, preferably 0.05 to 50 g/10 min are preferred.

"Substantially linear" means that a polymer has a backbone substituted with from 0.01 to 3 long-chain branches per 1000 carbons in the backbone.

"Long-chain branching" or "LCB" means a chain length that exceeds that of a short chain that results from incorporation of an alpha-olefin into the backbone of an EAO polymer or an EAO polymer blend. Although carbon-13 nuclear magnetic resonance ($C^{13}$ NMR) spectroscopy cannot distinguish or determine an actual number of carbon atoms in the chain if the length is greater than six carbon atoms, the presence of LCB can be determined, or at least estimated, from molecular weight distribution (MWD) of the EAO polymer(s). It can also be determined from a melt flow ratio (MFR) or ratio ($I10/I_2$) of melt index ($I_{10}$), determined via ASTM D-1238 (190° C., 10 kg weight) to $I_2$.

"Interpolymer" refers to a polymer having polymerized therein at least two monomers. It includes, for example, copolymers, terpolymers and tetrapolymers. It particularly includes a polymer prepared by polymerizing ethylene with at least one comonomer, typically an alpha olefin (α-olefin) of 3 to 20 carbon atoms ($C_3$–$C_{20}$). Illustrative α-olefins include propylene, 1-butene, 1-hexene, 4-methyl-1-pentene, 1-heptene, 1-octene and styrene. The α-olefin is desirably a $C_3$–$C_{10}$ α-olefin. Preferred copolymers include EP, EB, ethylene/hexene-1 (EH) and EO polymers. Illustrative terpolymers include an ethylene/propylene/octene terpolymer as well as terpolymers of ethylene, a $C_3$–$C_{20}$ α-olefin and a diene such as dicyclopentadiene, 1,4-hexadiene, piperylene or 5-ethylidene-2-norbornene.

"Elastomeric", as used herein, means an EAO polymer or EAO polymer blend that has a density that is beneficially less than about 0.910 g/cc, desirably less than about 0.900 g/cc, preferably less than about 0.895 g/cc, more preferably less than about 0.880 g/cc, still more preferably less than about 0.875 g/cc, even more preferably less than about 0.870 g/cc and a percent crystallinity of less than about 33%, preferably less than about 29% and more preferably less than about 23%. The density is preferably greater than about 0.850 g/cc. Percent crystallinity is determined by differential scanning calorimetry (DSC)

SLEPs are characterized by narrow MWD and narrow short chain branching distribution (SCBD) and may be prepared as described in U.S. Pat. Nos. 5,272,236 and 5,278,272, relevant portions of both being incorporated herein by reference. The SLEPs exhibit outstanding physical properties by virtue of their narrow MWD and narrow SCBD coupled with long chain branching (LCB).

U.S. Pat. No. 5,272,236 (column 5, line 67 through column 6, line 28) describes SLEP production via a continuous controlled polymerization process using at least one reactor, but allows for multiple reactors, at a polymerization temperature and pressure sufficient to produce a SLEP having desired properties. Polymerization preferably occurs via a solution polymerization process at a temperature of from 20° C. to 250° C., using constrained geometry catalyst technology. Suitable constrained geometry catalysts are disclosed at column 6, line 29 through column 13, line 50 of U.S. Pat. No. 5,272,236.

A preferred SLEP has a number of distinct characteristics, one of which is an ethylene content that is between 20 and 90 wt %, more preferably between 30 and 89 wt %, with the balance comprising one or more comonomers. The ethylene and comonomer contents are based on SLEP weight and selected to attain a total monomer content of 100 wt %. For chain lengths up to six carbon atoms, SLEP comonomer content can be measured using $C^{13}$ NMR spectroscopy.

Additional distinct SLEP characteristics include $I_2$ and MFR or $I_{10}/I_2$. The interpolymers desirably have an $I_2$ of 0.01–30 g/10 min, more preferably from 0.05–10 g/10 min. The SLEP also has a $I_{10}/I_2$ (ASTM D-1238)≧5.63, preferably from 6.5 to 15, more preferably from 7 to 10. For a SLEP, the $I_{10}/I_2$ ratio serves as an indication of the degree of LCB such that a larger $I_{10}/I_2$ ratio equates to a higher degree of LCB in the polymer.

SLEPs that meet the aforementioned criteria include, for example, ENGAGE® polyolefin elastomers and other polymers produced via constrained geometry catalysis by The Dow Chemical Company and DuPont Dow Elastomers L.L.C.

The high melting polymer (polyolefin) component of the TPEs of this invention is a homopolymer of propylene or a copolymer of propylene with an (α-olefin such as ethylene, 1-butene, 1-hexene or 4-methyl-1-pentene or a blend of a homopolymer and a copolymer or a nucleated homopolymer, a nucleated copolymer or a nucleated blend of a homopolymer and a copolymer. The α-olefin is preferably ethylene. The copolymer may be a random copolymer or a block copolymer or a blend of a random copolymer and a block copolymer. As such, this component is preferably selected from the group consisting of polypropylene (PP) homopolymers and propylene/ethylene copolymers. This component has a melt flow rate (MFR) (230° C. and 2.16 kg weight) of 0.3 to 60 g/10 min, preferably 0.8 to 40 g/10 min and more preferably 1 to 35 g/10 min.

As used herein, "nucleated" refers to a polymer that has been modified by addition of a nucleating agent such as Millad™, a dibenzyl sorbitol commercially available from Milliken. Other conventional nucleating agents may also be used.

Preparation of polypropylene (PP) also involves the use of Ziegler catalysts such as a titanium trichloride in combination with aluminum diethylmonochloride, as described by Cecchin, U.S. Pat. No. 4,177,160. Polymerization processes used to produce PP include the slurry process, which is run at about 50–90° C. and 0.5–1.5 MPa (5–15 atm), and both the gas-phase and liquid-monomer processes in which extra care must be given to the removal of amorphous polymer. Ethylene may be added to the reaction to form a polypropylene with ethylene blocks. PP resins may also be prepared by using any of a variety of metallocene, single site and constrained geometry catalysts together with their associated processes.

Suitable organic peroxides have a half life of at least one hour at 120° C. Illustrative peroxides include a series of vulcanizing and polymerization agents that contain α, α'-bis (t-butylperoxy)-diisopropylbenzene and are available from Hercules, Inc. under the trade designation VULCUP™, a series of such agents that contain dicumyl peroxide and are available from Hercules, Inc. under the trade designation Di-cup™ as well as Lupersol™ peroxides made by Elf Atochem, North America or Trigonox™ organic peroxides made by Moury Chemical Company. The Lupersol™ peroxides include Lupersol™ 101 (2,5-dimethyl-2,5-di(t-butylperoxy)hexane), Lupersol™ 130 (2,5-dimethyl-2,5-di (t-butylperoxy)hexane-3) and Lupersol™ 575 (t-amylperoxy-2-ethylhexonate). Other suitable peroxides include 2,5-dimethyl-2,5-di-(t-butylperoxy)hexane, di-t-butylperoxide, 2,5-di(t-amylperoxy)-2,5-dimethylhexane, 2,5-di-(t-butylperoxy)-2,5-diphenylhexane, bis(alpha-methylbenzyl)peroxide, benzoyl peroxide, t-butyl perbenzoate and bis(t-butylperoxy)-diisopropylbenzene.

The peroxide is used in an amount sufficient to provide at least three of the following four characteristics: a STI of at least 20, preferably at least 25, more preferably at least 30 and still more preferably at least 35, a MS that is at least 1.5 times, preferably at least 1.6 times and more preferably at least two times that of the composition without rheology modification, a ST that is at least 10° C. greater than that of the composition without rheology modification, and an UST limit that is at least 10° C. greater than that of the composition without rheology modification. The peroxide is suitably present in an amount that is within a range of from about 1500 to about 10,000 parts by weight per million parts by weight of polymer (ppm). The range is desirably from about 2,000 to about 8,000, preferably from about 3,000 to about 6,000 ppm.

The peroxide can be added by any conventional means known to skilled artisans. If a processing oil is to be used in preparing the rheology-modified compositions of the invention, the peroxide may be injected during processing, as a solution or dispersion in the processing oil or another dispersing aid, into a processing apparatus at a point where the polymer blend is in a melt state. Concentration of the peroxide in the solution or dispersion may vary, but a 20 to 40 percent by weight (wt %) concentration, based on solution or dispersion weight, provides acceptable results. The solution or dispersion can also be admixed with and allowed to imbibe on dry blended polymer pellets. If the peroxide is a liquid, it may be used as; is without forming a solution or dispersion in a processing oil. One can, for example, add a liquid peroxide to a high speed blender together with dry polymer pellets, subject the blender contents to mixing action for a short period of time and then allow the contents to rest until imbibing action is regarded as sufficiently complete. On a small scale, a Welex Papenmeier Type TGAHK20 blender (Papenmeier Corporation) can be used to provide: mixing action for a time period such as 30–45 seconds. This is typically followed by a rest period of about 30 minutes. A more preferred procedure involves introducing the peroxide as a solid into the compounding apparatus together with the polymer pellets as the pellets enter a compounding apparatus such as at the throat of an extruder, adding it to a polymer melt in a compounding apparatus such as a Haake, a Banbury mixer, a Farrel continuous mixer or a Buss kneader. Alternately, the peroxide can be added as a solid in conjunction with dry blending of the polymer pellets.

In order to detect the presence of, and where desirable, quantify insoluble gels in a polymer composition such as the rheology-modified compositions of this invention, simply soak the composition in a suitable solvent such as refluxing xylene for 12 hours as described in ASTM D 2765-90, method B. Any insoluble portion of the composition is then isolated, dried and weighed, making suitable corrections based upon knowledge of the composition. For example, the weight of non-polymeric components that are soluble in the solvent is subtracted from the initial weight and the weight of non-polymeric components that are insoluble in the solvent is subtracted from both the initial and final weight. The insoluble polymer recovered is reported as percent gel (% gel) content. For purposes of this invention, "substantially gel-free" means a percent gel content that is desirably less than about 10%, more desirably less than about 8%, preferably less than about 5%, more preferably less than about 3%, still more preferably less than about 2%, even more preferably less than about 0.5% and most preferably below detectable limits when using xylene as the solvent. For certain end use applications where gels can be tolerated, the percent gel content can be higher.

The compositions of this invention may be compounded with any one or more materials conventionally added to polymers. These materials include, for example, EAOs that have not been rheology modified, process oils, plasticizers, specialty additives including stabilizers, fillers (both reinforcing and non-reinforcing) and pigments. These materials may be compounded with compositions of this invention either before or after such compositions are rheology modified. Skilled artisans can readily select any suitable combination of additives and additive amounts as well as timing of compounding without undue experimentation.

If the rheology-modified EAO polymer blend is further modified or admixed with an EAO that has not been rheology-modified, such as an EO copolymer, with a Mooney viscosity ($ML_{1+4}$, 125° C.)$\geq$20, desirably$\geq$40, preferably$\geq$50, more preferably$\geq$60 and still more preferably$\geq$70, the unmodified EAO is desirably present in an amount that falls within a range of from greater than 0 to 30 wt %, based on total composition weight. The range is preferably from 5 to 20 wt %, more preferably from 8 to 20 wt %.

Process oils are often used to reduce any one or more of viscosity, hardness, modulus and cost of a composition. The most common process oils have particular ASTM designations depending upon whether they are classified as paraffinic, naphthenic or aromatic oils. An artisan skilled in the processing of elastomers in general and the rheology-modified TPE compositions of this invention in particular will recognize which type of oil will be most beneficial. The process oils, when used, are desirably present in an amount within a range of from about 15 to about 50 wt %, based on total composition weight.

A variety of specialty additives may be advantageously used in compositions of this invention. The additives include antioxidants, surface tension modifiers, anti-block agents, lubricants, antimicrobial agents such as organometallics, isothtazolones, organosulfurs and mercaptans; antioxidants such as phenolics, secondary amines, phophites and thioesters; antistatic agents such as quaternary ammonium compounds, amines, and ethoxylated, propoxylated or glycerol compounds; fillers and reinforcing agents such as carbon black, glass, metal carbonates such as calcium carbonate, metal sulfates such as calcium sulfate, talc, clay or graphite fibers; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy, 4-alkoxyenzophenone, a salicylate, a cynoacrylate, a nickel chelate and a benzylidene malonate and oxalanilide; and zeolites, molecular sieves and other known deodorizers. A preferred hindered phenolic antioxidant is Irganox™ 1076 antioxidant, available from Ciba-Geigy Corp. Each of the above additives, if used, typically does not exceed 45 wt %, based on total composition weight, and are advantageously from about 0.001 to about 20 wt %, preferably from about 0.01 to about 15 wt % and more preferably from about 0.1 to about 10 wt %.

The rheology-modified TPE compositions of this invention may be fabricated into parts, sheets or other form using any one of a number of conventional procedures for processing TPEs. The compositions can also be formed, spun or drawn into films, fibers, multi-layer laminates or extruded sheets, or can be compounded with one or more organic or inorganic substances, on any machine suitable for such purposes.

The TPE compositions: of this invention have surprisingly improved properties relative to simple blends of an EAO copolymer and a high melting polymer such as PP that have not been subjected to rheology modification. Rheology modification, whether it be by way of an organic peroxide or other free radical generating compound, use of a source of radiation, such as ultraviolet light or e-beam, or application of heat, with or without a compound such as an organic peroxide, provides a combination of at least three of four desirable and improved properties. Two of the properties of interest are an STI of at least 20, preferably at least 25, more preferably at least 30 and still more preferably at least 35, and an UST limit, as measured by Rheometrics Dynamic Analysis (RDA), that is at least 10° C. greater than that of the composition without rheology modification. In an uncompounded state, two additional properties of interest for compositions of the present invention are a MS that is at least 1.5, preferably at least 1.6 and more preferably at least 2 times that of a like composition save for the absence of the rheology modification, and a ST that is at least 10° C. greater than that of the composition without rheology modification.

The following examples illustrate but do not, either explicitly or by implication, limit the present invention. Unless otherwise stated, all parts and percentages are by weight, on a total weight basis. Examples of the present invention are identified by Arabic numerals and comparative examples are represented by letters of the alphabet.

EXAMPLES 1–3 AND COMPARATIVE EXAMPLES A–F

Nine sample compositions, Examples (Ex) 1–3 and Comparative Examples (Comp Ex) A–F, are prepared from three different EAO polymers using a basic procedure for Ex 1–3 and certain modifications of the basic procedure for Comp Ex A–F. All samples are processed by feeding dry polymer pellets to a ZSK 30 millimeter (mm), Werner Pfleiderer, co-rotating, twin screw extruder equipped with high shear mixing screw sections. The extruder operates at a speed of 250 revolutions per minute (RPM) to effectively melt process the dry pellets.

For Ex 1–3 and Comp; Ex D–F, the dry polymer pellets are a dry blend of 75 wt % EAO polymer and 25 wt % PP-1, a PP homopolymer (Profax® 6231, MFR (230° C. and 2.16 kg weight) of 20 g/10 min, commercially available from Himont), both percentages being based on dry blend weight.

The EAO polymers are: EAO-1, a polyolefin elastomer (POE) (Engage® 8150, DuPont Dow Elastomers L.L.C.) having a melt index ($I_2$) of 0.5 g/10 min (190° C., 2.12 kilograms (kg)) and a density ($\rho$) of 0.868 g/cc; EAO-2, a POE (Engage® 8180, DuPont Dow Elastomers L.L.C.) having an $I_2$ of 0.5 g/10 min and a $\rho$ of 0.863 g/cc; and EAO-3, a POE (Engage® 8842, DuPont Dow Elastomers L.L.C.) having an $I_2$ of 1 g/10 min and a $\rho$ of 0.858 g/cc.

A 20 wt % solution of peroxide (2,5-dimethyl-2,5-di(t-butylperoxy)hexane, available as Lupersol® 101 from Elf Atochem, North America) in O-3, a petroleum distillate, solvent-refined heavy paraffinic oil (Tuflo® 10, Lyondell) having a viscosity of 100 Saybolt Universal Seconds (SUS) at 100° Farenheit (38° C.) is injected into the extruder at the beginning of zone 2 (of five zones).

The solution is injected at a flow rate sufficient to provide a peroxide concentration of 3000 parts per million (ppm), based on weight of polymer plus peroxide. Zones 1 and 2 are set, respectively, at 170 and 180° C. Zones 3–5 and the extruder die are set at 200° C. These temperatures provide a peak melt temperature of no more than about 230° C.

Table I summarizes data for the nine samples. Table I identifies the EAO polymer, specifies the wt % PP-1, and includes the amount of peroxide in ppm, STI, MS in cN, UST in ° C., and ST in ° C. Although not shown in Table I, the EAO polymers used in Table I typically have the following properties: an STI of from about 3 to about 10, an MS of from about 3 to about 7 cN, an UST of from about 57 to about 70° C. and a ST of from about 30 to about 45° C.

TABLE I

| Ex/Comp Ex | EAO | PP-1 (wt %) | Peroxide (ppm) | STI | MS (cN) | UST (° C.) | ST (° C.) |
|---|---|---|---|---|---|---|---|
| 1 | 1 | 25 | 3000 | 61.2 | 7.3 | 92 | 112 |
| 2 | 2 | 25 | 3000 | 76.2 | 8.9 | 85 | 109 |
| 3 | 3 | 25 | 3000 | 44.5 | 9.5 | 54 | 96 |
| A | 1 | 25 | 0 | 5.5 | 4.8 | 72 | 79 |
| B | 2 | 25 | 0 | 11.3 | 5.4 | 70 | 78 |
| C | 3 | 25 | 0 | 3.0 | 3.6 | 61 | 85 |
| D | 1 | 0 | 3000 | 38.1 | 24.8 | 71 | 45 |
| E | 2 | 0 | 3000 | 33.1 | 28.3 | 62 | 39 |
| F | 3 | 0 | 3000 | 26.3 | 19.3 | 57 | 29 |

The UST value of 54° C. for Ex 3 is believed to be in error. This belief stems from the data trends for other Examples of this invention.

The data presented in Table I illustrate several points. First, other than the anomalous data point for UST in Ex 3, the peroxide modified combination of an EAO and a PP (Ex 1–3) provides a desirable balance of STI, MS, UST, and ST relative to the same combination without peroxide modification (Comp Ex A–C) and a peroxide modified EAO (Comp Ex D–F). Second, a peroxide modified EAO (Comp Ex D–F) has better STI and MS values, but lower ST values, than an EAO/PP blend lacking peroxide modification (Comp Ex A–C). Third, neither a peroxide modified EAO nor an unmodified blend has an UST that is as good as that of the peroxide modified blend (Ex 3 excepted). The UST and ST values of Ex 1–3 are particularly unexcepted in light of the failure of rheology modification (by way of peroxide addition) of an EAO (Comp Ex D–F) to provide like UST and ST values. Similar results are expected with other EAO polymers, propylene polymers, and rheology modifiers or modification processes, all of which are disclosed herein.

EXAMPLES 4–7

Using EAO-1 and PP-2, the procedure and apparatus of Ex 1–3 are used to prepare four additional samples with the same peroxide at levels of 1500 and 4500 ppm rather than 3000 ppm, and PP levels of 15 and 35 wt % rather than 25 wt %. PP-2 Profax™ 6523, Himont) has a MFR of 4 g/10 min. Table II summarizes data for Ex 4–7.

TABLE II

| | | | Range of Applicability | | | |
|---|---|---|---|---|---|---|
| Ex | PP-2 (wt %) | Peroxide (ppm) | STI | MS (cN) | UST (° C.) | ST (° C.) |
| 4 | 35 | 4500 | 85 | 3.7 | 146 | 111 |
| 5 | 35 | 1500 | 23 | 4.0 | 132 | 112 |
| 6 | 15 | 4500 | 80 | 20.0 | 67 | 97 |
| 7 | 15 | 1500 | 34 | 9.5 | 64 | 115 |

The data indicate that there is considerable latitude in tailoring desired properties simply by varying the PP and peroxide contents of EAO/PP blends.

EXAMPLES 8 AND 9

Using EAO-4 (Engage® 8190, a blend of 93 wt % of EAO-3 and 7 wt % PP-4 (Profax™ 6323, a PP homopolymer having a MFR of 12 g/10 min, available from Himont), the blend having an overall density of 0.859 g/cc and an $I_2$ of one g/10 min and being available from DuPont Dow Elastomers L.L.C.) and PP-4, the procedure and apparatus of Ex 1–3 are used to prepare two additional samples with the same peroxide at levels of 6000 and 10000 ppm rather than 3000 ppm. Due to equipment limitations, the concentration of peroxide in the peroxide/oil is increased, respectively, to 25 and 33 wt %. A pump addition rate of 2.4 wt % of solution, based on weight of solution plus polymer, provides the 6000 ppm level and a rate of 3 wt % provides the 10,000 ppm level. Ex 8 and 9 have respective STI's of 56 and 100. The UST of Ex 8 and 9 are, respectively, 150° C. and 157° C. The MS of Ex 9 is 11 cN.

When the polymer output from the extruder is extruded through a 0.040 inch (1 mm) thick ribbon die at 330° F. (166° C.), Ex 8 and 9 both yield a smooth ribbon with no visible gels. When tested in refluxing xylene for 12 hours according to ASTM D-2765-90, method B, the respective insoluble gel contents for Ex 8 and 9 are 0.1% and 1.45 wt %.

The data in these examples demonstrate that satisfactory results, in terms of insoluble gel content, are obtained at higher peroxide contents than used for Ex 1–7. Ex 8 and 9 also have satisfactory UST and MS, as shown above, and are expected to have satisfactory STI and ST. As the insoluble gel content should increase with increasing peroxide levels, Ex 1–7, all of which have lower peroxide levels, should also have lower gel contents. Similar results are expected with other EAO polymers, PP polymers and rheology modification additives or procedures, all of which are disclosed herein.

EXAMPLES 10–12 AND COMPARATIVE EXAMPLES G–I

Using the procedure and apparatus of Ex 1–3 and Comp Ex A–C, six additional sample materials are prepared. Ex 10–12 all use a peroxide rheology modifier and Comp Ex G–I do not.

Ex 10 and Comp Ex G are prepared from 75 wt % of EAO-5 (an experimental EPDM polymer having a Mooney viscosity of 45, an ethylene content of 75 wt % and a diene content of no more than 8 wt % and being available from DuPont Dow Elastomers L.L.C.) and 25 wt % of PP-1, both percentages being based on combined polymer weight. Ex 10 uses a peroxide level of 3000 ppm.

Ex 11 and Comp Ex H are prepared from a blend of 80 wt % of EAO-6, a linear EP polymer (Tafmer™ P0180, Mitsui Petrochemical) having an $I_2$ of 8 and a density of 0.87 g/cc, and 20 wt % of PP-2, both percentages being based upon combined polymer weight. Ex 11 uses a peroxide level of 6000 ppm.

Ex 12 and Comp Ex I are prepared from a blend of 80 wt % of EAO-7, a linear ethylene polymer (Exact® 4003, Exxon Chemical) and 20 wt % of PP-2, both percentages being based on combined polymer weight. Ex 12 uses a peroxide level of 6000 ppm.

Data for Ex 10–12 and Comp Ex G–I are summarized in Table III.

TABLE III

| Ex/<br>Comp<br>Ex | PP<br>(wt %) | Perox-<br>ide<br>(ppm) | STI | MS<br>(cN) | Range of Applicability<br>UST<br>(° C.) | ST (° C.) |
|---|---|---|---|---|---|---|
| 10 | 25 | 3000 | 174 | 26 | 159 | 111 |
| G | 25 | 0 | 30 | 12 | 64 | 52 |
| 11 | 20 | 6000 | 44 | 11.6 | 56 | 120 |
| H | 20 | 0 | 2.8 | <0.5 | 53 | 83 |
| 12 | 20 | 6000 | 65 | 8.7 | 88 | 120 |
| I | 20 | 0 | 2.2 | <0.5 | 87 | 70 |

The data presented in Table III show that other EAO polymers and PP polymers yield satisfactory results in terms of at least three of MS, STI, UST and ST when the rheology-modified compounds are compared with their respective unmodified counterparts. Similar results are expected with other EAO polymers and blends of EAO polymers, PP polymers, rheology modifiers or procedures and amounts of the same, all of which are disclosed above.

COMPARATIVE EXAMPLES J AND K

Two rheology-modified compositions are prepared using a different propylene polymer, a different procedure and a different apparatus than those used for Ex 1–3 and Comp Ex A–F. As an initial step, weigh feeders proportionally feed 75 parts of EAO-1 and 25 parts of PP-3, a propylene/ethylene copolymer (Rexene® 23S2A, MFR at 230° C. and 2.16 kg of 2 g/10 min, commercially available from Rexene Products Company) onto a vibratory belt. The vibratory belt dry blends the polymers as it feeds them to an extruder's throat.

The extruder is a Berlyn 2.5 inch (6.35 centimeter (cm)), 32:1 single screw extruder with a 75 horsepower (HP) motor. The extruder screw is a Newcastle Industries rheology modification screw (32.5 inch (82.55 cm) transition zone, 7.25 inch (18.42 cm) gear mixing zone, 13.5 inch (34.29 cm) vented metering zone, and 30.5 inch (77.47 cm) transition zone following an initial feed zone). The zones are heated to temperatures as follows: zone 1, 225° C.; zone 2, 225° C.; zone 3, 125° C.; zone 4, 200° C.; and zone 5, 200° C. The screw turns at a rate of 120 RPM to provide a polymer output of 150 pounds per hour (68.0 kilograms (kg) per hour). The polymer output is pelletized using a GALA underwater pelletizer and a 12 hole die (3 mm/hole) with, a two blade cutter head rotating at 1383 RPM.

A peroxide solution comprising 20% di(tertiary butyl peroxide) and 80% mineral oil (Drakeol® 34, 0.865 specific gravity, available from Penreco) is injected through a port in the extruder barrel at a point just past where a gear mixer starts. The solution is injected at a pressure of 2500 pounds per square inch (psi) (17.2 megapascals (MPa)) using a Williams V-Series pneumatic metering pump. The injection rates are adjusted to provide respective peroxide levels for Comp Ex J and K of 4000 ppm and 6000 ppm.

When the polymer output from the extruder is extruded through the ribbon die as in Ex 8 and 9, Comp Ex J and K both yield a product with a rough surface appearance and clearly visible gels. The respective insoluble gel contents for Comp Ex J and K are 22.4% and 26.6%.

When the compositions of Comp Ex J and K are processed using the twin screw apparatus of Ex 1–3 and lower initial zone temperatures, the enhanced mixing provided by that apparatus yields quite satisfactory results. When processed through the ribbon die, the compositions produce a smooth surface appearance and no visible gels. When subjected to the refluxing xylene test, there are no extractable insoluble gels.

The contrasting results obtained with the same composition on different apparatus highlight the importance of adequate dispersion of a rheology-modifier throughout a molten polymer composition before localized gels are created. Similar undesirable results, in terms of excessive insoluble gel content, are expected if temperatures within the extruder are too high or if a dispersing aid, such as the process oil, is omitted when adding a rheology modifier. Skilled artisans recognize that a dispersing aid may, however, be eliminated when rheology modification occurs via radiation rather than by use of an additive such as an organic peroxide.

EXAMPLES 13–16

Ex 13 is prepared using gravimetric feeders to feed 75 wt % EAO-8 pellets (Engage® 8100, an EO copolymer with a ρ of 0.87 g/cc and an $I_2$ of 1 g/10 min (DuPont Dow Elastomers L.L.C.)) and 25 wt % PP-4 pellets (Profax® 6323, polypropylene homopolymer with a MFR of 12 g/10 min, available from Himont) to a ZSK 30 mm twin screw extruder as in Ex 1–3. A 33 wt % solution of the same peroxide as in Ex 1–3 in O-2, a naphthenic oil having a viscosity of 200 SUS at 100° F. (38° C.) (available from Shell Chemical as Shellflex® 3271), is injected into the extruder at a point where a polymer melt begins to enter an intensive gear mixing section. The injection rate is proportioned to the polymer output such that the peroxide is present at a concentration of 7000 ppm. The extruder has six zones, all but two of them being set at 200° C. The other two zones are a feed zone set at 160° C. and an injection zone set at 170° C. Due to heat generated by shear mixing, the polymer melt reaches a temperature that does not exceed about 220° C. Based upon a residence time within the extruder that exceeds six half lives for the peroxide, substantially all of the peroxide is believed to be consumed within the extruder.

Ex 14 is prepared using the same polymer blend and peroxide solution as in Ex 13, but with a variation of the process used to prepare Ex 13. Instead of injecting the peroxide solution into the extruder, the peroxide solution is poured over the blended EAO and PP pellets and immediately placed in a tumbler mixer and allowed to mix for 30 minutes to allow the pellets to absorb the peroxide solution. The tumbler contents are then fed to the same extruder used to prepare Ex 13. This process variation simulates compounding in the absence of an injection pump capable of injecting peroxide to the extruder.

Ex 15 is prepared by another variation of the process of Ex 13. A solid peroxide, α, α'-bis(t-butylperoxy) diisopropylbenzene (available from Hercules, Inc. under the trade designation VULCUP™ R), is used in place of the peroxide solution. The peroxide, normally a waxy crystalline solid, is made into a powder with a spatula and then added in an amount of 7000 ppm to a fiber drum containing 75 wt % EAO-8 pellets and 25 wt % PP-4 pellets. The fiber drum is tumbled for 30 minutes to dry mix the ingredients which are then fed to the extruder. This process variation eliminates the need for liquid handling equipment.

Ex 16 duplicates Ex 13 save for changing the EAO to EAO-9 and increasing the peroxide amount to 8000 ppm. EAO-9 is an EO copolymer (Engage® 8003, available from DuPont Dow Elastomers L.L.C.) with a ρ of 0.885 g/cc and an I2 of 1 g/10 min.

Table IV summarizes the results obtained by evaluating the rheology-modified blends of Ex 13–16 in terms of STI and UST. The variations in STI are believed to stem from a number of factors. First, the effect of peroxide modification on an EAO/PP blend tends to increase with increasing EAO density. This is supported by comparing Ex 16 (EAO-9 density of 0.885 g/cc) with Ex 13 (EAO-8 density of 0.87 g/cc). Second, certain peroxides are more effective than others in building STI. This is supported by comparing Ex 15, which uses VULCUP™ R, with Ex 13, which uses Lupersol® 101. Third, an increase in the amount of peroxide, as in Ex 16 versus Ex 13, also increases STI.

TABLE IV

| Ex No | STI | UST |
|---|---|---|
| 13 | 97 | 150 |
| 14 | 111 | 149 |
| 15 | 196 | 159 |
| 16 | 168 | 156 |

EXAMPLE 17

Using the procedure of Ex 15, a sample is prepared from 75 wt % EAO-10 pellets, 25 wt % PP-4 pellets and 5000 ppm of the peroxide used in Ex 15. EAO-10 is an experimental EO copolymer prepared by DuPont Dow Elastomers L.L.C. and having a Mooney viscosity ($ML_{1+4}$, 125° C.) of 70 and a density of 0.87 g/cc. The resulting rheology-modified blend has a UST of 166° C. and an STI of 250.

EXAMPLE 18

Using gravimetric feeders, 80 wt % EAO-2 pellets and 20 wt % PP-4 pellets are fed to a Berstorf 40 mm twin screw extruder. A 25 wt % solution of the same peroxide as in Ex 1–3 in the same process oil as used in Comp Ex J–K is injected into the extruder as in Ex 13. The extruder has nine zones, all but two of them being set at 200° C. The other zones are a feed zone set at 170° C. and an injection zone set at 180° C. Due to heat generated by shear mixing, the polymer melt reaches a temperature that does not exceed 235° C. Based upon a residence time within the extruder that exceeds six half lives for the peroxide, substantially all of the peroxide is believed to be consumed within the extruder. This material is used as an intermediate for further compounding.

A compound is prepared using 70 parts of the intermediate, 20 parts of the same process oil as used in preparing the intermediate and 10 parts of stearate coated calcium carbonate ($CaCO_3$) (Kotamite™, commercially available from ECC International). The compound is processed through a three inch (7.6 cm) single screw extruder equipped with a refrigerator gasket die. The resulting gasket profile has three closed sections that are inflated with air and a wall thickness that varies from 0.017 inch (0.43 cm) to 0.60 inch (1.5 cm). The compound extrudes in a problem-free manner at a rate of 67 feet (20.4 meters (m)) per minute. The extrudate has a MS that is sufficient to enable the profile to retain its shape until water spray cooling can reduce the profile to a temperature below the ST of the intermediate. The resulting gasket has a modulus that is low enough to allow it to be easily extended and compressed.

COMPARATIVE EXAMPLE L

A compound prepared from 57 wt % EAO-1, 17 wt % PP-3, 18 wt % of the process oil of Ex 18 and 10 wt % of the same $CaCO_3$ as used in Ex 18, all percentages being based on compound weight. The compound, when processed in the same manner as detailed in Ex 18, extrudes poorly. While there is no evidence of surface melt fracture, the MS is too low to prevent the gasket profile from collapsing. In addition, spraying water on the profile to cool it leads to rapid shrinkage and discernible part distortion. The resulting gasket is too stiff to extend and compress in the same manner as the gasket of Example 18.

EXAMPLES 19–25 AND COMPARATIVE EXAMPLES M–O

Rheology-modified and oil-extended compounds are prepared using the following procedure (with one modification for Comp Ex M–N). For Comp Ex M–O, no peroxide solution is added so only a single pass through the extruder is required. For Ex 19–25, the oil is injected into the extruder at pressures in excess of the barrel pressure during a second pass through the extruder. The amounts of oil are shown in Table V together with proportional feed ratios for components of the compounds. Those skilled in the art can readily modify this procedure in any of a number of ways. One modification, involving a single pass, injects a peroxide solution into the front part of an extruder and oil into the extruder prior to the end of the extruder.

Weigh feeders proportionally feed polymer components into the throat of the same extruder as used in Ex 18. Extrudate is pelletized as in Comp Ex J–K. Ex 19–24 use peroxide in an amount of 6000 ppm. For Ex 25, the peroxide amount is 10,000 ppm. Ex 25 also includes 10 pbw of calcium carbonate ($CaCO_3$).

For Ex 19–25, the EAO and PP are modified in the extruder under the same conditions as in Ex 18. This intermediate is then sent through the extruder at a flat temperature profile of 150° C. for a second pass through the extruder for addition of process oil and filler. For Comp Ex M and N, which do not have any peroxide modifier, a single pass through the extruder allows addition of the process oil and filler. Comp Ex M and N use a single temperature of, respectively, 150° C. and 175° C. for all extruder zones.

The resulting compounds are injection molded into test plaques using an Arburg Model 370C-800-225 (800 kN hydraulic clamping force) reciprocating screw injection molding machine (30 mm screw).

Injection molding processability is quantified by producing a plaque having an area of 154.8 square centimeters ($cm^2$) and a thickness of 0.312 cm. The plaque is produced using an apparatus with barrel temperatures set in a profiled fashion with a first barrel zone at 107° C., subsequent zones sequentially at 177° C., 196° C. and 204° C., and a nozzle set at 196° C. A plaque mold temperature, while set at 18° C., is typically about 21° C. during molding. The screw angular velocity and back pressure are, respectively, 30 mm/sec. and 10 bar (1 megapascal (MPa)). A shot volume of 65 cc is targeted for each plaque. The shot size and screw position at which the process switches from injection to hold is adjusted at the highest injection velocity to be evaluated such that the cavity is barely full. The time to fill the cavity to this point and the peak injection pressure are recorded at several injection velocities (5, 8, 10, 15, 20, 30, 50 and 70 cc/second). The peak injection pressure is plotted against the apparent shear rate (see Table VB) in the runner which is calculated using the injection velocity and mold physical dimensions. The peak injection pressure which results from the set injection velocity is used as an indication of processability since it is a process response dependent upon melt viscosity, injection velocity and the rate of solidification of the flow front.

Those skilled in the art of injection molding recognize that injection pressures are countered by clamp tonnage in a molding machine. They also recognize that unsuccessful injection molding resins will generate an injection pressure that exceeds available clamp tonnage prior to the mold cavity being filled at the highest practical melt temperature. When the peak pressure exceeds the clamp tonnage, flash occurs. As such, a compound that generates a significantly lower injection pressure at a given injection velocity (shear rate) than another resin is considered more processable.

The resulting compounds are subjected to physical property testing to determine Hardness (Shore A), $I_2$, $I_{10}$, scratch/mar resistance, 80° C. heat aging, and shear thinning behavior.

Hardness is determined in accordance with ASTM D 2249-91. An average of 5 measurements is taken at 10 second intervals on a 0.25 inch (0.6 cm) thick injection molded plaque.

The 120° C. Oven test involves placing an injection molded plaque (8 inch×4 inch×0.125 inch (20.3 cm×10.2 cm×0.3 cm) on a sheet of polytetrafluoroethylene (PTFE) in an oven set at a temperature of 120° C. for a period of 4 hours. The plaques are then visually evaluated by attempting to remove them from the PTFE sheet and rating samples as "good" if they can be removed without part distortion or destruction and "bad" if they are gooey and must be removed from the PTFE sheet by scraping with attendant part distortion.

Scratch/mar resistance (SMR) is determined by swiping the surface of an injection molded plaque with a saber saw blade in an "X" pattern. The plaques are then subjectively evaluated with those having the deepest grooves being rated as "bad" or "worse" and those with comparatively shallow grooves being rated as "good".

Specific Gravity (SG) is determined in accord with ASTM D 792-86. $I_2$ and $I_{10}$ are determined as explained above.

Test results are shown in Table VI A–B. For purposes of comparison, the same tests are performed using a styrene/butadiene/styrene (SBS) polymer composition that is available from J-Von Limited Partnership under the trade designation Hercuprene™ 310D11. The SBS compound is designated as Comp Ex O.

The polymer components are as follows: EAO-4; EAO-11, an EO copolymer (Engage® 8400, available from DuPont Dow Elastomers L.L.C.) having an $I_2$ of 30 g/10 min and a ρ of 0.870 g/cc; EAO-12, an EO copolymer (Engage® 8402, available from DuPont Dow Elastomers L.L.C.) having an $I_2$ of 30 g/10 min and a ρ of 0.902 g/cc; PP-2; PP-4; EAO-6; and EAO-13, a linear EB copolymer (Exact® 5008, available from Exxon Chemical) that has an $I_2$ of 10 g/10 min and a ρ of 0.865 g/cc.

The oils are as follows: O-1, a naphthenic oil having a viscosity of 400 SUS (Saybolt Universal Units) at 100° F. and being available from Shell Chemical as Shellflex® 371; O-2; and O-3.

TABLE V

Compounds

Ex/Comp Ex with Component amounts in wt % (based on Compound weight)

| Component | M | N | 19 | 20 | 21 | 22 | 23 | 24 | 25 |
|---|---|---|---|---|---|---|---|---|---|
| EAO-4 | 22 | 20 | 20 | 41 | 48 | — | — | 41 | 48 |
| EAO-11 | 20 | 15 | 15 | — | — | — | — | — | — |
| EAO-12 | 18 | 10 | 10 | — | — | — | — | — | — |
| EAO-6 | — | — | — | — | — | 44 | — | — | — |
| EAO-13 | — | — | — | — | — | — | 48 | — | — |
| PP-4 | — | 15 | 15 | 19 | 12 | 11 | 12 | 9.3 | 12 |
| O-1 | 40 | — | — | — | — | — | — | — | — |
| O-2 | — | — | — | — | 40 | 45 | 40 | 39 | 40 |

TABLE V-continued

Compounds

Ex/Comp Ex with Component amounts in wt % (based on Compound weight)

| Component | M | N | 19 | 20 | 21 | 22 | 23 | 24 | 25 |
|---|---|---|---|---|---|---|---|---|---|
| O-3 | — | 40 | 40 | 40 | — | — | — | — | — |
| Peroxide | N | N | Y | Y | Y | Y | Y | Y | Y |

— means not added; N means not added; Y means added

TABLE VIA

Test Results

Ex/Comp Ex

| Property/Test | M | N | O | 19 | 20 | 21 | 22 | 23 | 24 | 25 |
|---|---|---|---|---|---|---|---|---|---|---|
| Hardness (Shore A) | 40 | 60 | 48 | 55 | 46 | 40 | 48.4 | 37.4 | 43 | 45 |
| SG | 0.89 | n/a | 1.05 | n/a | n/a | 0.87 | 0.87 | 0.87 | 0.93 | 0.87 |
| $I_2$ (g/10 min) | 74 | — | 12 | 33 | 32 | 51 | 12 | 22 | 57 | 22 |
| $I_{10}$ (g/10 min) | 1097 | — | — | 520 | 590 | 600 | 250 | 430 | 720 | — |
| SMR | bad | bad | good | good | good | good | good | good | good | good |
| Oven Aging | melts | 1* | 2* | 3* | 3* | 3* | 3* | 3* | 3* | 3* |
| UST (° C.) | 55 | 64 | 81 | 88 | — | — | — | — | — | 105 |

— means not measured
1* means shrinks unacceptably
2* means shrinks slightly
3* means maintains dimensions of original shape

TABLE VIB

Pressure (P) Test

| Ex/Comp Ex | M | N | O | 19 | 20 | 21 | 22 | 23 | 24 | 25 |
|---|---|---|---|---|---|---|---|---|---|---|
| Temp (° F./° C.) for P Test | 310/ 154 | 365/ 185 | 365/ 185 | 365/ 185 | 365/ 185 | 365/ 185 | 365/ 185 | 365/ 185 | 365/ 185 | 365/ 185 |
| P (psi/MPa) @ 22289 $s^{-1}$ | 9000/ 62.0 | 5515/ 38.0 | 7718/ 53.2 | 5860/ 40.4 | 5299/ 36.5 | 5947/ 41.0 | 7416/ 51.1 | 7416/ 51.1 | 6494/ 44.8 | 7229/ 49.8 |
| P (psi/MPa) @ 15921 $s^{-1}$ | 7417/ 51.1 | 4522/ 31.2 | 6408/ 44.2 | 4320/ 29.8 | 3845/ 26.5 | 4478/ 30.9 | 5890/ 40.6 | 5270/ 36.3 | 4882/ 33.7 | 5515/ 38.0 |
| P (psi/MPa) @ 9552 $s^{-1}$ | 5936/ 40.9 | 3715/ 25.6 | 5342/ 36.8 | 3096/ 21.3 | 2693/ 18.6 | 3355/ 23.1 | 4468/ 30.8 | 3902/ 26.9 | 3614/ 24.9 | 4075/ 28.1 |
| P (psi/MPa) @ 6368 $s^{-1}$ | 5118/ 35.3 | 3024/ 20.8 | 4882/ 33.7 | 2549/ 17.6 | 2275/ 15.7 | 2880/ 19.9 | 3787/ 26.1 | 3341/ 23.0 | 3024/ 20.8 | 3456/ 23.8 |
| P (psi/MPa) @ 4776 $s^{-1}$ | 4667/ 32.2 | 2678/ 18.5 | 4680/ 32.3 | 2290/ 15.8 | 2059/ 14.2 | 2549/ 17.6 | 3485/ 24.0 | 3096/ 21.3 | 2794/ 19.3 | 3125/ 21.5 |
| P (psi/MPa) @ 3184 $s^{-1}$ | 3976/ 27.4 | 2405/ 16.6 | 4594/ 31.7 | 2074/ 14.3 | 1872/ 12.9 | 2333/ 16.1 | 3139/ 21.6 | 2837/ 19.6 | 2549/ 17.6 | 2880/ 19.8 |
| P (psi/MPa) @ 2547 $s^{-1}$ | 3722/ 25.7 | 2304/ 15.9 | 4579/ 31.6 | 1987/ 13.7 | 1829/ 12.6 | 2304/ 15.9 | 3038/ 20.9 | 2635/ 18.2 | 2419/ 16.7 | 2765/ 19.1 |
| P (psi/MPa) @ 1592 $s^{-1}$ | 3800/ 26.2 | 2146/ 14.8 | 4694/ 32.4 | 1872/ 12.9 | 1771/ 12.2 | 2174/ 15.0 | 2923/ 20.2 | 2534/ 17.5 | 2246/ 15.5 | 2577/ 17.8 |

The data presented in Tables VIA and VIB demonstrate that compound viscosity is critical when a relatively thin walled (2–4 mm) long flow length (18 inches or 45.7 cm) part is injection molded. In Comp Ex M, thee EAO compound fills a 4 mm thick, 45.7 cm long shaft of a work boot. In order to minimize polymer bleeding during injection of a boot sole, the EAO compound is processed at a minimum temperature of 310° F. (154° C.) to achieve requisite fill and minimize polymer solidification time. When the compound of Comp Ex M is injected into a 2.5 mm thick, 45.7 cm long work boot shaft mold at 310° F. (154° C.), the compound viscosity is so high that the mold is not completely filled. Increasing the temperature above 310° F. (154° C.) lengthens the polymer solidification time so that, during injection of the sole compound, polymer bleeding occurs. It is only when the UST and STI of an EAO-containing compound is improved, as demonstrated by the oven aging, TMA and in-mold pressure data for Ex 19–25 in Tables VIA and VIB, that the compound properly fills the 2.5 mm thick, 45.7 cm long work boot shaft mold and generally precludes bleeding when the boot sole is injected on top of a portion of the shaft. Similar results are expected with other polypropylene resins, EAO polymers and EAO polymer blends, other rheology modifiers or processes and other additives such as fillers and process oils, all of which are disclosed herein.

EXAMPLE 26

Using the procedure and the peroxide of Ex 1–3, a rheology-modified intermediate is prepared from 75 parts of EAO-3, 20 parts of PP-4 and 5 parts of high density polyethylene (HDPE) (Dowlex® IP-60, The Dow Chemical Company). The peroxide, dispersed in O-2, is added at a 10,000 ppm.

The intermediate, in an amount of 44 parts, is blended with 9 parts of EAO-14, an EPDM terpolymer (Nordel® 4770, DuPont Dow Elastomers L.L.C.) having a Mooney viscosity of 70, an additional 7 parts of HDPE, 7 parts of CaCO3 and 33 parts of O-2 to obtain a final blend. Physical property test results, as with Ex 19–25 are summarized in Tables VIIA and VIIB.

EXAMPLE 27

Ex 26 is duplicated save for substituting 9 parts of EAO-10 for a like amount of EAO-14. Physical property test results are shown in Tables VIIA and VIIB.

EXAMPLE 28

Using the procedure and peroxide of Ex 15, a rheology-modified intermediate is prepared from 45 parts of EAO-8, 30 parts of EAO-3 and 25 parts of PP-4. The peroxide is added at a level of 5000 ppm.

The intermediate is then blended with sufficient O-2 to provide a final compound that contains 40 wt % O-2 and 60 wt % intermediate. Physical property test results are shown in Tables VIIA and VIIB.

TABLE VIIA

| Property Test | Ex/Comp Ex | | |
|---|---|---|---|
| | 26 | 27 | 28 |
| Hardness (Shore A) | 55 | 55 | 51 |
| SG | 0.93 | 0.93 | 0.88 |
| $I_2$ (g/10 min) | 11 | 15 | 12 |
| $I_{10}$ (g/10 min) | 200 | 263 | 400 |
| SMR | good | good | good |
| Oven Aging | good | good | good |
| UST(° C.) | 112 | 110 | 94 |

TABLE VIIB

| | Pressure (P) Test | | |
|---|---|---|---|
| Ex/Comp Ex | 26 | 27 | 28 |
| Temp (° F./° C.) for P Test | 365/185 | 365/185 | 365/185 |
| P (psi/MPa) @ 22289 $s^{-1}$ | 8136/56.1 | 7804/53.8 | 7500/51.7 |
| P (psi/MPa) @ 15920 $s^{-1}$ | 6480/44.7 | 6202/42.8 | 5800/40.0 |
| P (psi/MPa) @ 9552 $s^{-1}$ | 5213/35.9 | 4806/33.1 | 4400/30.3 |
| P (psi/MPa) @ 6368 $s^{-1}$ | 4579/31.6 | 4232/29.2 | 3800/26.2 |
| P (psi/MPa) @ 4776 $s^{-1}$ | 4291/29.6 | 3983/27.5 | 3450/23.8 |
| P (psi/MPa) @ 3184 $s^{-1}$ | 3989/27.5 | 3792/26.1 | 3200/22.1 |
| P (psi/Mpa) @ 2547 $s^{-1}$ | 3917/27.0 | 3703/25.5 | 3050/21.0 |
| P (psi/Mpa) @ 1592 $s^{-1}$ | 3773/26.0 | 3630/25.0 | 2950/20.3 |

The data presented in Tables VIIA and VIIB demonstrate two key points. First, Ex 26 and 27 show that a rheology-modified compound representative of the present invention can be blended with an EAO that is not rheology-modified to provide a final blend with satisfactory properties. Second, Ex 28 shows that a rheology-modified blend of two EAO polymers and a PP polymer can be extended with additional processing oil and still provide satisfactory physical properties. Similar results are expected with other EAO polymers, high melting polymers and peroxides, all of which are disclosed herein. Similar results are also expected with other rheology modification techniques that are disclosed herein.

EXAMPLES 29–30 AND COMPARATIVE EXAMPLES P–Q

Four sample materials are prepared using EAO-4 as the EAO. In Comp Ex P, EAO-4 is processed through an injection molding apparatus as detailed below without a blowing agent. In Comp Ex Q, a blowing agent (EPIcor™ 882, a proprietary endothermic concentrate commercially available from EPI Environmental Products) is added to EAO-4 in an amount of 2% by weight of polymer. In Ex 29, a blend of 80% EAO-4 and 20% of PP-2, both percentages being based on combined weight of polymers, is modified as in Ex 8 with 6000 ppm of peroxide. In Ex 30, the composition of Example 29 is modified with 2% by weight of the same blowing agent as in Comp Ex Q.

All compositions are processed using an Arburg 370C injection molding apparatus that has a screw operating at a tip speed of 30 mm per second, a back pressure set at 10 bar (1 MPa), a dosage set at 40 cc, and the following zones and associated temperatures: feed zone=400° F. (204° C.), Zone 2, 420° F. (216° C.), Zones 3 and 4 440° F. (227° C.), nozzle=430° F. (221° C.) to provide a melt temperature of 455° F. (235° C.) as measured by infrared pyrometry. Extrudate from the apparatus is injected at a velocity of one cubic centimeter per second (cc/sec) over a fill time of 1.28 sec into a 1"×6"×0.225" (2.5 cm×15.2 cm×0.3 cm) mold that is at a temperature of 90° F. (32° C.) to provide a molded bar. The mold is held at a pressure of 700 bar (70 MPa) for 30 seconds, then cooled for an additional 45 sec before removal of the molded bar.

A visual inspection of the molded bars shows that Comp Ex P is dimensionally unstable in that it does not have the same dimensions of the mold and is not aesthetically acceptable; Comp Ex Q is foamed and has the same dimensions as the mold, but with a poor surface due to gas entrapment that leads to, among other undesirable features, pitting; and Ex 30 has a much better surface than Comp Ex 9, a higher part mass than either Comp Ex P or Comp Ex Q, and several more and finer bubbles than the bar of Comp Ex Q. Similar results are expected with Ex 29 and other compositions of the present invention.

EXAMPLES 31–32

An amount of a peroxide imbibed onto a solid carrier (Luperco™ 802-40KE, commercially available from Elf Atochem, North America) that is sufficient to provide an active peroxide level of 6000 ppm is dry blended with an amount of PP-3 and an amount of EAO-4 and then processed to provide a melt at a temperature of 375° F. (191° C.) using a 44:1 length to diameter (L/D) ratio, single screw extruder operating at a screw speed of about 25 RPM. Ex 31 has 10% PP-3 and 90% EAO-4 and Ex 32 has 20% PP-3 and 80% EAO-4. Extrudate is pelletized at a rate of 220 pounds per hour (pph) for Ex 31 and 186 pph for Ex 32. The pellets yield a product via extrusion or injection molding that is substantially gel-free. The STI for Ex 32 is 100

Ex 31 and 32 demonstrate that compositions of this invention may be processed on a single screw extruder. Similar results are expected with other compositions of this invention.

EXAMPLES 33–37 AND COMPARATIVE EXAMPLE R

Six compositions containing 64.6% EAO-1, 29.6% of PP-5, a propylene/ethylene copolymer (Profax® 8623 with a melt flow rate (MFR) of 2 g/10 min commercially available from Himont), varying levels of peroxide and 4.8% CaCO$_3$ (Omyacarb™ UF available from Omya, Inc) are processed using two apparatus in series. They are first processed using a twin screw extruder as in Ex 1–3. They are then processed on a calendering apparatus. The calendering apparatus is fed by an extruder that has the following temperature profile: feed zone, 290° F. (143.3° C.); zone 2, 300° F. (148.9° C.), zone 3, 350° F. (176.7° C.) and die temperature, 365° F. (185° C.). The apparatus has a bottom roll, a center roll and a top roll. The top roll is neutral in that it applies no pressure. The bottom roll temperature is 307° F. (152.8° C.) and the center roll temperature is 130° F. (54° C.). The melt temperature at the calendar feed is 365° F. (185° C.). The bottom roll has a speed of 0.1 yard/min (0.09 meter/min) and the center roll has a speed of 3.8 yard/min (3.47 meters/min). The apparatus produces a film having a thickness of 20 mils (mm). Five of the compositions (Ex 33–37) have peroxide levels as shown in Table VIII. The sixth composition (Comp Ex R) contains no peroxide.

The calendered compositions are subjected to physical property testing as in Ex 1–3. Test results are also shown in Table VIII.

TABLE VIII

| Ex/Comp Ex. | Peroxide Level, | UST (° C.) | MS (cN) |
|---|---|---|---|
| R | 0 | 62 | — |
| 33 | 3500 | 77 | 9.5 |
| 34 | 4500 | 81 | — |
| 35 | 5500 | 85 | 10.8 |
| 36 | 6500 | 86 | 14 |
| 37 | 7500 | 94 | 16 |

— means not measured

The results in Table VIII show that rheology modification provides satisfactory results when compositions are subjected to calendering. These results suggest satisfactory performance in calendering applications such as roofing membranes and automotive trim. Similar results are expected with other processes, compositions and additives, all of which are disclosed herein.

What is claimed is:

1. A rheology-modified, substantially gel-free thermoplastic elastomer composition comprising at least one elastomeric, linear or substantially linear, ethylene/alpha-olefin polymer or ethylene/alpha-olefin polymer blend and at least one polymer selected from polypropylene homopolymers and propylene/ethylene copolymers, wherein the rheology is modified by way of a free radical generating compound, radiation or application of heat, the thermoplastic elastomer composition having at least three of four characteristics, the characteristics being a shear thinning index of at least 20, a melt strength that is at least about 1.5 times that of the composition without rheology modification, a solidification temperature that is at least 10° C. greater than that of the composition without rheology modification, and an upper service temperature limit that is at least 10° C. greater than that of the composition without rheology modification, said thermoplastic elastomer composition having an insoluble gel content, as determined by ASTM D 2765-90, method B, below detectable limits when using xylene as a solvent, said elastomeric polymer having a density up to about 0.92 g/cc and said elastomeric polymer blend having a density up to about 0.91 g/cc.

2. The composition of claim 1, wherein the rheology modification is peroxide induced using a level of peroxide sufficient to provide the combination of characteristics, the peroxide being an organic peroxide selected from the group consisting of α, α'-bis(t-butylperoxy)-diisopropylbenzene, dicumyl peroxide, 2,5-dimethyl-2,5-di(t-butylperoxy) hexane-3,2,5-dimethyl-2,5-di(t-butylperoxy)hexane, 2,5(t-amylperoxy-2-ethylhexonate), 2,5-dimethyl-2,5-di-(it-butylperoxy)hexane, di-t-butylperoxide, 2,5-di(t-amylperoxy)-2,5-dimethylhexane, 2,5-di-(t-butylperoxy)-2, 5-diphenylhexane, bis(alpha-methylbenzyl)peroxide, t-butyl perbenzoate, benzoyl peroxide and bis(t-butylperoxy)-diisopropylbenzene.

3. The composition of claim 1, wherein the melt strength of the rheology-modified composition is at least two times that of the composition without rheology modification.

4. The composition of claim 1, wherein the ethylene/α-olefin polymer has polymerized therein at least one α-olefin comonomer, the α-olefin containing from 3 to 20 carbon atoms.

5. The composition of claim 1, wherein the ethylene/α-olefin polymer is a diene-modified polymer, the diene being selected from the group consisting of norbornadiene, dicyclopentadiene, 1,4-hexadiene, piperylene or 5-ethylidene-2-norbornene and mixtures thereof.

6. The composition of claim 1, wherein the high melting polymer is a nucleated polymer.

7. The composition of claim 1, further comprising at least one additive selected from the group consisting of process oils, fillers and blowing agents, the process oil being present in an amount within a range of from 0 to about 50 weight percent, the filler being present in an amount within a range of from 0 to about 70 weight percent, and the blowing agent being present in an amount within a range of from 0 to about 10 weight percent, all amounts being based on total composition weight, the filler, when present, being selected from the group consisting of glass, silica, carbon black, metal carbonates, metal sulfates, talc, clay and graphite fibers.

8. A process for preparing a rheology-modified, substantially gel-free TPE composition, the process comprising: a) providing a combination of an organic peroxide and a molten polymer composition that comprises at least one of (1) an elastomeric "linear or substantially linear", ethylene/alpha-olefin polymer or ethylene/alpha-olefin polymer blend and (2) polymer selected from the group consisting of polypropylene homopolymers and propylene/ethylene copolymers; and b) maintaining the combination in a melt state while subjecting it to conditions of shear sufficient to disperse the peroxide throughout the molten polymer composition, effect rheology modification of the molten polymer composition and substantially preclude formation of insoluble polymer gels, sufficient rheology modification being measured by a combination of at least three of four characteristics, the characteristics being a shear thinning index of at least 20, a melt strength that is at least about 1.5 times that of the polymer blend without rheology modification, a solidification temperature that is at least 10° C. greater than that of the polymer blend without rheology modification, and an upper service temperature limit that is at least 10° C. greater than that of the polymer blend without rheology modification, "said thermoplastic elastomer composition having an insoluble gel content, as determined by ASTM D 2765-90, method B, below detectable limits when using xylene as a solvent, said elastomer polymer having a density up to about 0.92 g/cc and said elastomeric polymer blend having a density up to about 0.91 g/cc".

9. The process of claim 8, further comprising a step (c) wherein the rheology-modified molten polymer composition is converted into an article of manufacture that has the combination of at least three of four characteristics.

10. The process of claim 9, further comprising sequential intermediate steps b1) and b2) that precede step c), step b1) comprising recovery of the rheology modified polymer blend as a solid and step b2) comprising conversion of the solid to a melt state sufficient for fabricating the article of manufacture.

11. The process of any of claims 8–10, wherein the combination is prepared by one of (a) forming the molten polymer composition and then adding the organic peroxide to the molten polymer combination, or (b) adding the organic peroxide to at least one component of the polymer composition and then converting the composition to a molten polymer composition.

12. The process of any of claims 8–10, wherein the high melting polymer is added to the molten polymer composition while the composition is in a melt state, but subsequent to rheology modification of the elastomeric ethylene/alpha-olefin polymer or elastomeric ethylene/alpha-olefin polymer blend.

13. The process of any of claims 8–10, wherein the rheology-modified composition further comprises at least one additive selected from the group consisting of process oils, fillers and blowing agents, the process oil being present in an amount within a range of from 0 to about 50 weight percent, the filler being present in an amount within a range of from 0 to about 70 weight percent, and the blowing agent being present in an amount within a range of from 0 to about 10 weight percent, all amounts being based on total composition weight, the filler, when present, being selected from the group consisting of glass, silica, carbon black, metal carbonates, metal sulfates, talc, clay and graphite fibers.

* * * * *